United States Patent [19]

Karbowski

[11] 4,228,710

[45] Oct. 21, 1980

[54] CUT-OFF SAW ATTACHMENT FOR MACHINE TOOL

[75] Inventor: Sylvester G. Karbowski, New Haven, Conn.

[73] Assignees: Louis W. Palmieri; Marcia K. Palmieri, both of Hamden, Conn.

[21] Appl. No.: 41,701

[22] Filed: May 23, 1979

[51] Int. Cl.³ .................... B23D 53/10; B27B 13/00
[52] U.S. Cl. ................................ 83/794; 83/574;
144/35 A; 30/380
[58] Field of Search ............... 83/788, 794, 574, 799,
83/800; 30/380; 144/35 A

[56] References Cited

U.S. PATENT DOCUMENTS

| 2,436,692 | 2/1948 | Greene | 144/35 A |
| 2,596,081 | 5/1952 | Sacrey | 30/380 |
| 2,645,255 | 7/1953 | Francescatti et al. | 83/794 X |
| 3,118,337 | 1/1964 | Ferris | 83/799 X |

FOREIGN PATENT DOCUMENTS 946567  8/1956  Fed. Rep. of Germany ........ 144/35 A

Primary Examiner—Donald R. Schran
Attorney, Agent, or Firm—McCormick, Paulding & Huber

[57] ABSTRACT

A band saw attachment releasably secured to the quill of a vertical milling machine and driven by the rotary spindle of the machine is movable with the quill generally toward and away from the work-support surface of the machine table and may be tilted with the quill and relative to the support surface to provide clearance between one portion of the saw blade and the work-support surface. Blade guide rollers are mounted on the attachment to twist a portion of the saw blade to a normal position relative to the work-support surface when the quill is tilted relative to the support surface.

12 Claims, 8 Drawing Figures

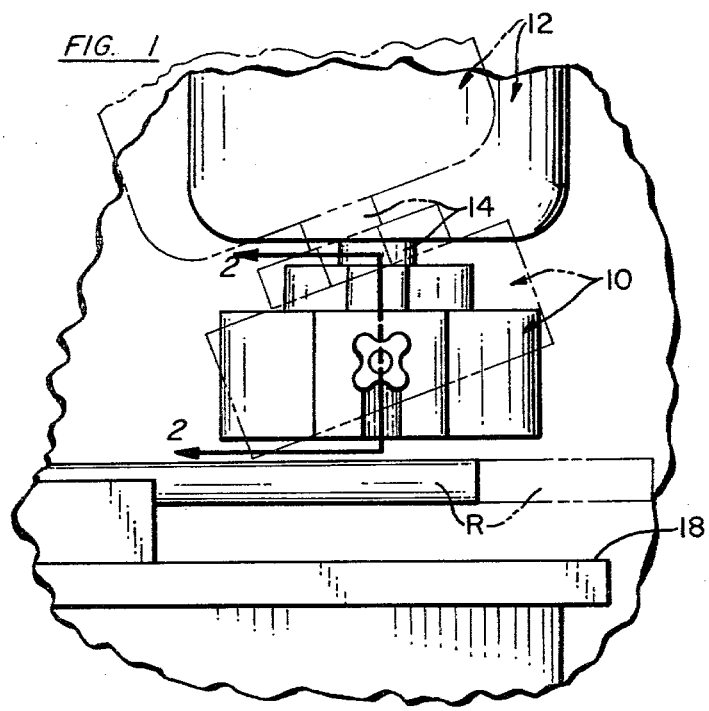
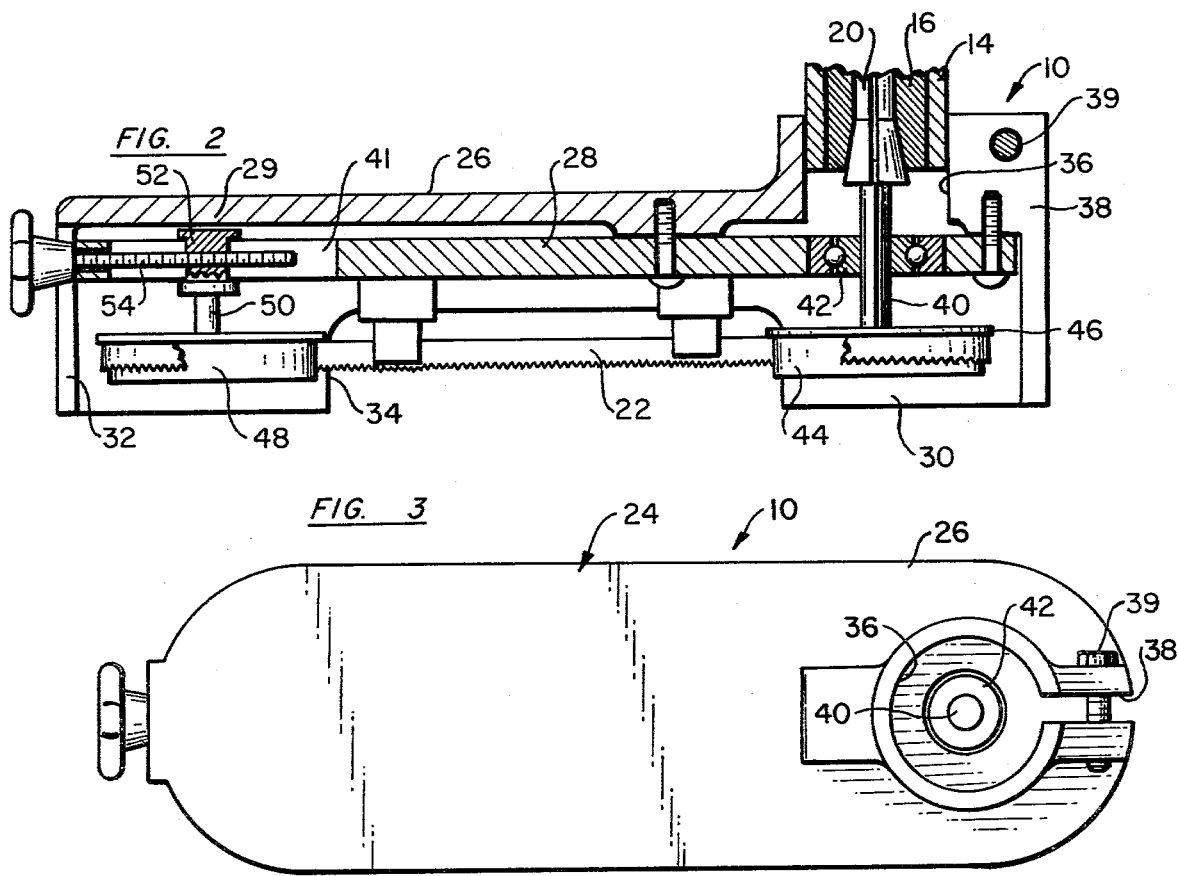
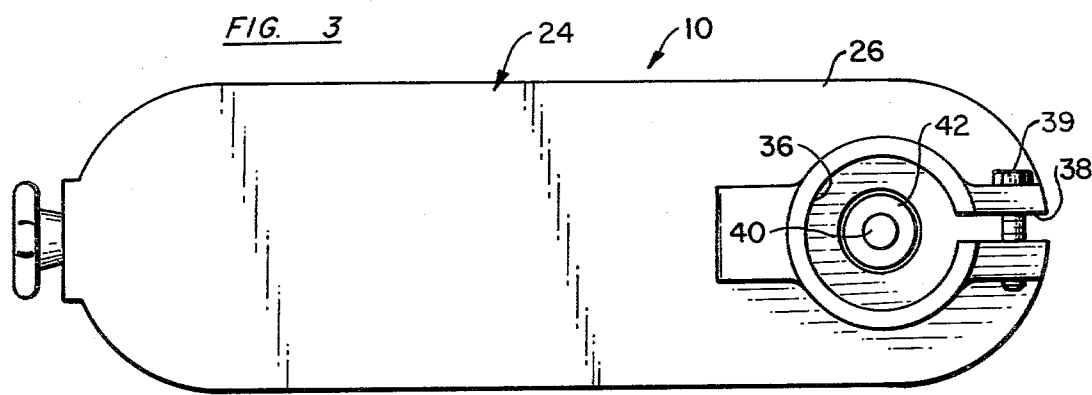

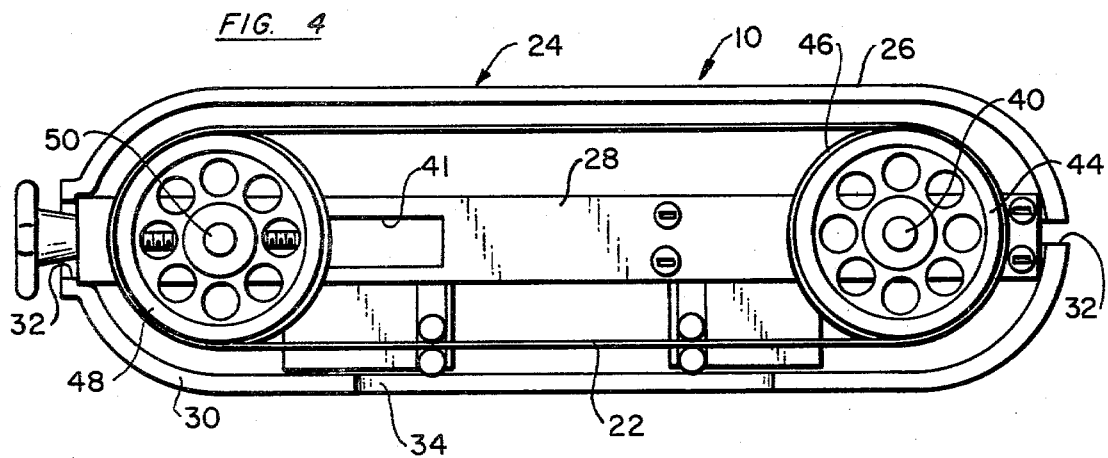
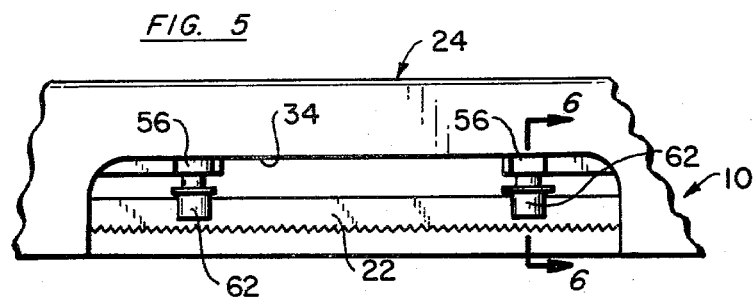
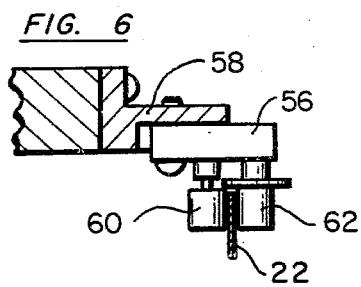
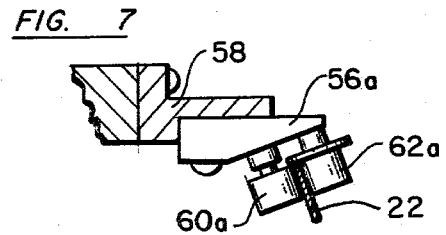
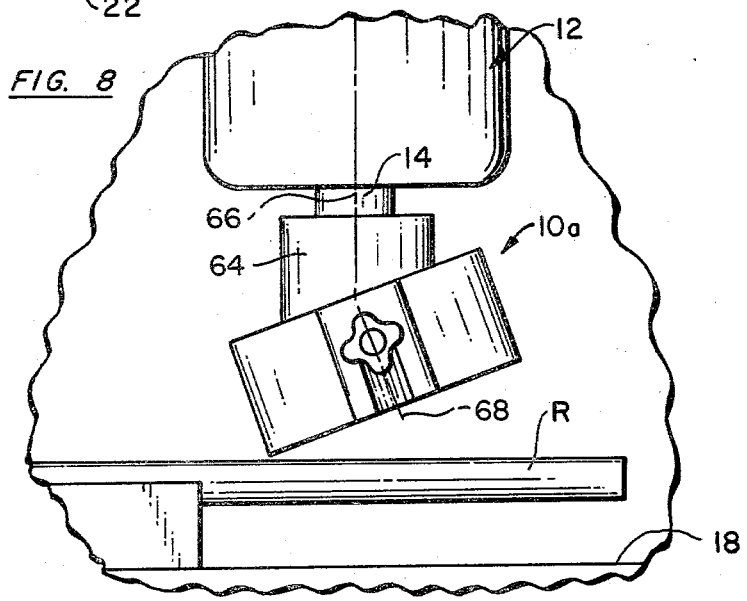

4,228,710

CUT-OFF SAW ATTACHMENT FOR MACHINE TOOL

BACKGROUND OF THE INVENTION

This invention relates in general to band saws and deals more particularly with a cut-off saw attachment for a machine tool or the like.

The cut-off saw attachment of the present invention is particularly adapted to satisfy the requirements of small machine shops, home work shops and the like which have occasional need for a cut-off saw for cutting bar or rod stock to desired length or performing other relatively light duty sawing operations. Heretofore, various special purpose power saws have been available for performing such operations, however, such machines are usually relatively large self-contained units, have individual drive motors, are relatively expensive and occupy considerable floor space.

The general aim of the present invention is to provide a portable, cut-off saw attachment for a machine tool, which is driven by the machine tool, and which may be manufactured and sold at relatively low cost.

SUMMARY OF THE INVENTION

In accordance with the present invention a cut-off saw attachment is provided for a machine tool which has a work-support table, a spindle support member supported for movement generally toward and away from the table, a rotary spindle journaled in the support member, and means for coupling a tool to the spindle for rotation therewith. The saw attachment comprises a frame, a drive shaft journaled on the frame, means for releasably securing the frame in fixed position to the spindle support member of the machine tool with the drive shaft coupled to the spindle by the coupling means. The attachment further includes a drive pulley mounted on the drive shaft, an idler shaft supported on the frame in axially parallel relation to the drive shaft, an idler pulley mounted on the idler shaft, and an endless band saw blade mounted on the drive pulley and the idler pulley and extending therebetween. The saw blade has a generally rectilinear portion which extends through a throat region between the pulleys.

BRIEF DESCRIPTION OF THE DRAWING

FIG. 1 is a fragmentary side elevational view of a machine tool shown with a cut-off saw attachment embodying the invention attached thereto.

FIG. 2 is a fragmentary sectional view taken along the line 2—2 of FIG. 1.

FIG. 3 is a plan view of the cut-off saw attachment as shown in FIG. 2.

FIG. 4 is a bottom view of the cut-off saw attachment as shown in FIG. 2.

FIG. 5 is a fragmentary side elevational view of the cut-off saw attachment as viewed from the left in FIG. 1.

FIG. 6 is a fragmentary sectional view taken generally along the line 6—6 of FIG. 5.

FIG. 7 is similar to FIG. 6 but shows another embodiment of the invention.

FIG. 8 is similar to FIG. 1 and shows still another embodiment of the invention.

DETAILED DESCRIPTION OF PREFERRED EMBODIMENT

Turning now to the drawing a cut-off saw attachment embodying the present invention and designated generally by the reference numeral 10 is shown in FIG. 1 mounted on a machine tool indicated generally at 12. The illustrated machine tool 12 comprises a vertical milling machine and has a head which carries a spindle support member or quill 14. A spindle 16 is journaled for rotation in the quill, as shown in FIG. 2. The quill 14 is supported for movement toward and away from a table of the machine which has a work-support surface 18. A collet 20 carried by the spindle 16, and shown in FIG. 2, is ordinarily used to couple a rotary cutter or other tool to the spindle 16. The head of the vertical milling machine 10 is further arranged so that it may be tilted to an inclined position relative to the work-support surface 18, as shown in broken lines in FIG. 1.

The cut-off saw attachment 10 has an endless saw blade 22 and is shown in FIG. 1 attached in fixed position to the quill 14. The saw blade 22 is supported by a pair of wheels and coupled in driving relation to the spindle 16 by the collet 20, as will be hereinafter further discussed. An elongated piece of rod stock R is shown supported in a holding fixture, such as a vee-block, which rests on the work-support surface 18. The saw attachment 10 is movable with the quill 14 and into cutting engagement with the rod R as will be hereinafter more fully discussed.

Considering now the cut-off saw attachment 10 in further detail and further referring to FIGS. 2–5, the attachment 10 has a frame indicated generally at 24 which includes a guard cover 26 and a mounting plate 28. The illustrated guard cover 26 is an elongated metal casting which has a top wall 29 and a peripheral guard skirt 30 which depends from the top wall. A narrow vertically extending and downwardly opening slot 32 is formed in the guard skirt at the outer end of the guard cover. The skirt 30 also has a horizontally elongated and downwardly opening recess 34 formed in one side thereof, as best shown in FIG. 5. A boss extends upwardly from the top wall and has a cylindrical hole 36 which extends therethrough. The inside diameter of the hole is approximately equal to the outside diameter of the quill 14, which it is adapted to receive. A slot 38 extends inwardly through the peripheral skirt 26 at the inner end of the guard cover and through the boss to divide the inner end portion of the guard cover into two parts. The guard cover 26 is clamped to the quill 14 by a clamping screw 39 which extends through a cylindrical hole in one part of the boss and transversely of the slot 38 to threadably engage the other part of the boss on the opposite side of the slot.

The mounting plate 28 is secured to integral bosses formed on the underside of the top wall 29 which maintain it in downwardly spaced relation to the upper wall, substantially as shown in FIG. 2. A longitudinally extending slot 41 is formed in the outer portion of the plate 28, substantially as shown in FIGS. 2 and 4. A drive shaft 40 extends through the plate 28 and is journaled in coaxial alignment with the spindle 16 by a bearing 42 mounted in the plate, as shown in FIG. 2. The upper end of the drive shaft 40 is coupled in nonrotatable engagement with the spindle 16 by the collet 20. A drive wheel 44 mounted at the lower end of the drive shaft 40 has an enlarged annular flange 46 at its inner end. An idler wheel 48 similar to the drive wheel 46 is mounted on an idler shaft 50 supported on the mounting plate 28 in axially parallel relation to the shaft 40. More specifically, the idler shaft 50 is carried by a slide block 52 supported for sliding movement within the slot 41 and retained therein. A tensioning screw 54 extends through a cylindrical hole in the outer end of the mounting plate 28 and into the slot 41 and is threadably engaged with the slide block 52. The band saw blade 22 is received on and extends between the wheels 44 and 48. It will be noted that the drive wheel and the idler wheel are spaced apart so that the band saw blade 22 has a rectilinear portion which extends throughout a throat region between the two wheels which support it. The throat region of the blade is exposed within the recess 34, generally as shown in FIG. 5.

The working portion of blade 22 is further supported within the throat region by a set of blade guides 56, 56 mounted on the frame 28 at opposite ends of the throat region, as shown in FIG. 5. Each blade guide 56 is mounted in a sliding way formed on a bracket 58 fastened to the mounting plate 28. Each blade guide 56 includes a pair of rollers 60 and 62 arranged to engage opposite sides of a blade received therebetween. The roller 62 has an enlarged flange at its inner end to provide a backup surface for the inner or non-cutting edge of the blade 22. The axes of the rollers 60 and 62 are generally parallel to the axes of the wheels 44 and 48.

When the saw attachment 10 is used to cut-off a relatively short piece of material, such as an end portion of the rod R, the attachment is arranged in its full line position of FIG. 1, wherein the cutting portion of the blade is supported in a normal position relative to the work-support surface 18, that is the portion extending between the blade guides 56, 56. The milling machine 10 is then operated to move the quill 14 toward the table 18 at a controlled rate while the saw blade 22 moves in cutting engagement with the rod R. However, if the cut-off saw attachment 10 is to be used to cut off a longer piece of material, that is a piece of material having a length greater than the distance between opposite portions of the blade 22, as measured at the throat, the attachment 10 must be tilted from its full line position of FIG. 1. This is done to provide clearance between the portion of the blade opposite the working portion and the portion of the guard skirt 30 opposite the recess 34.

Preparatory to cutting off a long piece of material, such as an end of the rod R shown partially in broken lines in FIG. 1, the blade guides 56, 56 are removed from the attachment and another set of blade guides 56a, 56a are positioned on the attachment. A typical blade guide 56a, shown in FIG. 7, is similar in most respects to the guide 56, shown in FIG. 6, however, when the blade guides 56a, 56a are secured to the mounting frame 28 the axes of the various guide rollers 60a and 62a are inclined with respect to the axes of the drive wheel 44 and the idler wheel 48. Thus, the working portion of the blade, which extends through the throat region, will be twisted to an inclined position relative to the remaining portions of the blade by the blade guides 56a, 56a. After the attachment 10 is secured to the machine 12, the head of the machine is tilted to an angle of inclination with the vertical angle which is equal to the included angle between the axes of the guide rollers and a plane defined by the axes of the wheels 44 and 48. The working portion of the blade will then be maintained by the guide rollers in a position generally normal to the work-support surface 18. The quill 14 may then be advanced at a controlled rate and a vertical direction toward the work-support surface 18 to bring the saw blade into and move it in cutting engagement with the rod R.

While the attachment 10 has been illustrated with reference to a vertical milling machine, it should be understood that a cut-off saw attachment, in accordance with the invention, may also be provided for use with machine tools of other types.

In FIG. 8 there is shown another cut-off saw attachment embodying the invention and indicated generally by the reference numeral 10a. The attachment 10a is particularly adapted for use with a machine tool to cut off a long piece of material without first tilting the spindle of the machine tool. The cut-off saw 10a is similar to the cut-off saw 10 previously described, but includes an angle drive unit 64 which provides drive connection between the drive wheel 44 and the machine spindle 16. The drive unit 64 may, for example, comprise an integral part of the attachment 10 or may be a separate drive adaptor for connection to the quill of a machine tool and to which the attachment 10a is connected. The drive unit 64 has an input shaft which is coupled to the machine tool spindle 16 by the collet 20. The drive unit 64 also has an output shaft arranged with its axis angularly inclined to the axis of the input shaft. The axis of the input shaft and the axis of the output shaft are respectively indicated at 66 and 68 in FIG. 8. The output shaft carries a drive wheel (not shown) which is substantially identical to the drive wheel 44 previously described and which drives a saw blade. A suitable drive means, such as a set of bevel gears (not shown), is provided for rotating the output shaft about its axis 68 in response to rotation of the input shaft about its axis 66. The blade guides used with the attachment 10a are similar to the blade guides 56a shown in FIG. 7, however, the axes of the guide wheels 60a, 62a are parallel to the input shaft axis 66. Thus, when the attachment 10a is set up in an associated machine tool, such as the tool 12 the working portion of the blade will be maintained in a position normal to the work-support surface 18 of the machine table by the blade guides 56a, 56a.

I claim:

1. A cut-off saw attachment for a machine tool having means defining a work-support surface, a spindle support member movable generally toward and away from the work-support surface, a spindle journaled for rotation in said support member, and a coupling member carried by said spindle, said cut-off saw attachment comprising a frame, means for securing said frame in fixed position relative to said spindle support member for movement therewith, a drive wheel journaled for rotation relative to said frame, drive means connected to said drive wheel and coupled to said spindle by said coupling member for rotating said drive wheel in response to rotation of said spindle, and idler wheel supported for rotation on said frame in axially parallel relation to said drive wheel, said drive wheel and said idler wheel defining a throat region therebetween, and an endless band saw blade mounted on said drive wheel and said idler wheel in engagement with peripheral portions thereof and extending therebetween, said saw blade having a generally rectilinear portion extending through said throat region.

2. A cut-off saw attachment as set forth in claim 1 including means for positioning said attachment with the axes of said drive wheel and said idler wheel inclined to said work-support surface and means for maintaining a portion of said blade within said through region in normal relation to said work support surface.

3. A cut-off saw attachment as set forth in claim 1 wherein said drive means comprises an axially elongated drive shaft journaled on and extending through said frame, said drive wheel being mounted on one end of said drive shaft, said coupling member being coupled to the other end of said drive shaft.

4. A cut-off saw attachment as set forth in claim 2 wherein said positioning means comprises means associated with said machine tool for varying the angular position of said spindle relative to said work-support surface.

5. A cut-off saw attachment as set forth in claim 1 wherein said drive means comprises a input shaft coupled to said spindle by said coupling member and an output shaft connected to said drive wheel and having its axis inclined to the axis of said input shaft.

6. A cut-off saw attachment as set forth in claim 5 wherein said drive means comprises a drive adaptor and said means for securing said frame comprises said drive adaptor.

7. A cut-off saw attachment as set forth in claim 1 and including tensioning means for moving said idler wheel generally toward and away from said drive wheel to vary the tension in said saw blade.

8. A cut-off saw attachment as set forth in claim 7 wherein said idler shaft is carried by a block slidably supported on said frame and said tensioning means includes an adjustment screw for moving said block relative to said frame.

9. A cut-off saw attachment as set forth in claim 1 wherein said means for securing said frame comprises a part of said frame.

10. A cut-off saw attachment as set forth in claim 1 wherein said frame includes a guard cover and a mounting frame, said guard cover has a top wall and peripheral skirt depending from said top wall, said mounting plate is fastened to the under side of said top wall and said drive wheel and said idler wheel are supported on said mounting plate.

11. A cut-off saw attachment as set forth in claim 10 wherein said guard cover comprises said means for securing said frame.

12. A cut-off saw attachment as set forth in claim 11 wherein said support member comprises a generally cylindrical member, said guard cover has a boss projecting above said top wall and a cylindrical hole extending through said boss and said top wall and having an inside diameter substantially equal to the diameter of said cylindrical member for receiving said cylindrical member therein, a vertical slot extending through said peripheral skirt, said top wall and said boss and communicating with said cylindrical hole, and a clamping fastener extending across said slot and threadably engaging said boss for clamping said boss in engagement with said cylindrical member.

* * * * *

UNITED STATES PATENT AND TRADEMARK OFFICE
CERTIFICATE OF CORRECTION

PATENT NO. : 4,228,710

DATED : October 21, 1980

INVENTOR(S) : Sylvester G. Karbowski

It is certified that error appears in the above—identified patent and that said Letters Patent are hereby corrected as shown below:

Column 4, line 56, "and" should be --an--.

Column 5, line 1, "through" should be --throat--.

Column 6, line 8, after "and" insert --a--.

Signed and Sealed this

Twenty-fourth Day of February 1981

[SEAL]

Attest:

RENE D. TEGTMEYER

Attesting Officer

Acting Commissioner of Patents and Trademarks